No. 894,629. PATENTED JULY 28, 1908.
R. L. GRAVES.
FERTILIZER DISTRIBUTER.
APPLICATION FILED MAY 6, 1907.
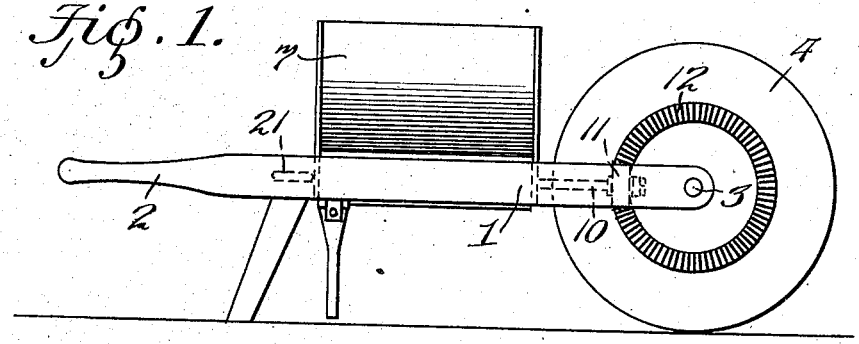
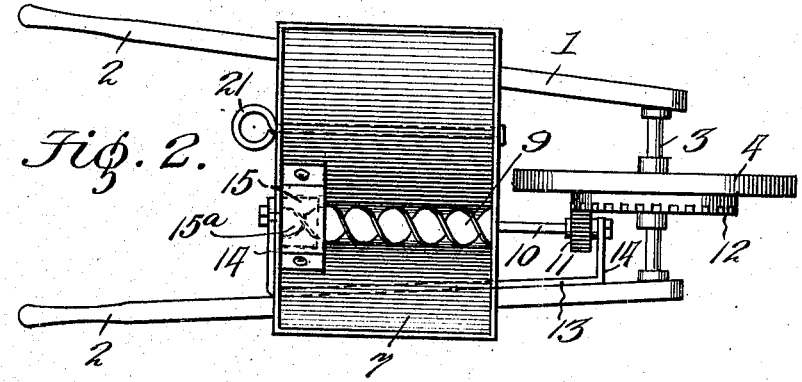
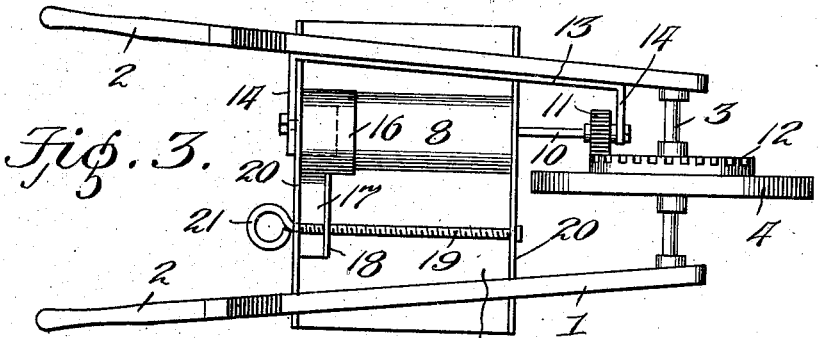
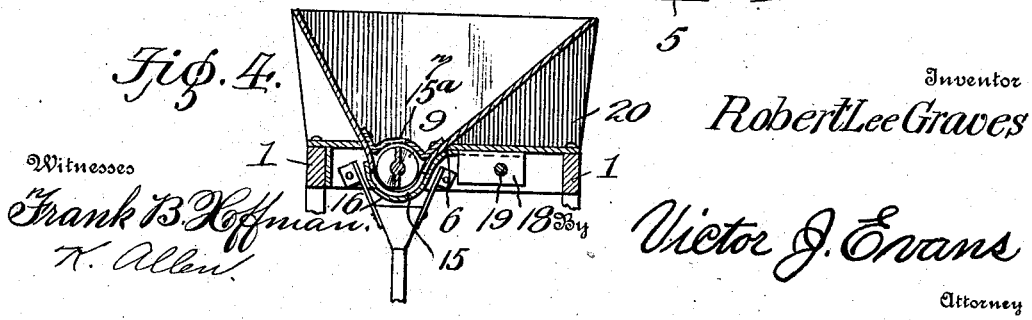
Witnesses
Frank B. Hoffman
K. Allen
Inventor
Robert Lee Graves
By Victor J. Evans
Attorney

UNITED STATES PATENT OFFICE.

ROBERT LEE GRAVES, OF CENTERVILLE, MISSISSIPPI.

FERTILIZER-DISTRIBUTER.

No. 894,629.  Specification of Letters Patent.  Patented July 28, 1908.

Application filed May 6, 1907. Serial No. 372,074.

*To all whom it may concern:*

Be it known that I, ROBERT LEE GRAVES, a citizen of the United States of America, residing at Centerville, in the county of Wilkinson and State of Mississippi, have invented new and useful Improvements in Fertilizer-Distributers, of which the following is a specification.

This invention relates to fertilizer distributers adapted primarily for manual propulsion and for directing fertilizer at the will of the operator.

The main object of the present invention is the production of a fertilizer distributer adapted to be propelled by the operator along any desired line and to automatically and evenly distribute the fertilizer during such propulsion.

The invention will be described in the following specification, reference being had particularly to the accompanying drawings, in which:—

Figure 1 is a view in side elevation of a fertilizer distributer constructed in accordance with my invention. Fig. 2 is a plan of the same. Fig. 3 is a bottom plan of the same. Fig. 4 is a transverse section of the distributer taken through the shield plate.

Referring particularly to the drawings, my improved fertilizer distributer is preferably arranged in the form of a wheelbarrow comprising side bars 1 formed at one end to provide handle portions 2 and at the opposite end to receive an axle 3 on which is mounted the shaft supporting wheel 4. A platform 5 is secured on the side bars 1 of the frame preferably immediately in rear of the supporting wheel 4, said platform being formed adjacent one side throughout its length with an opening 6.

A hopper 7 is supported upon the platform in any proper manner, the relatively lower portion of the hopper being projected through the opening 6 in the form of a semi-cylindrical casing 8. Within the casing 8 and rearwardly supported in the end walls of the hopper is a feed screw 9, the operating shaft 10 of which projects forwardly beyond the forward wall of the hopper and is terminally provided with a gear 11 arranged to mesh with an enlarged gear 12 secured on the supporting wheel 4, or fixed to said wheel to revolve therewith. The respective ends of the shaft 10 are preferably supported in the bracket plate 13 secured to one side bar of the frame and having laterally projecting sections 14 to support the ends of the shaft. The casing 8 at the relatively rear end is formed with a discharge opening 15, so arranged that the material affected by the feed screw 9 will be directed to and discharged through the opening 15. A guard or shield plate 15ª covers the delivery end of the screw above the opening 15 and prevents discharge of any of the material except that fed by the screw. An adjustable gate or cover plate 16 is provided to permit adjustment of the size of the discharge opening, said gate being shaped to conform to the shape of the casing and formed with a laterally projecting arm 17 having at the relatively forward edge a depending flange 18. The flange 18 is formed with a threaded opening to receive a screw rod 19, the terminals of which rod are mounted in edge flanges 20 depending from the platform 5. Beyond one flange 20, preferably the rear flange, the screw rod 19 is bent into ring or other form to provide an operating handle 21 whereby the screw may be conveniently rotated and the cover or gate 16 adjusted longitudinally of the casing 8 to limit the size of the discharge opening as desired.

In use with fertilizer of the desired character in the hopper, the operator grasping the handles 2 will move the distributer forward on the supporting wheel 4. This movement imparts rotation to the feed screw 9 with the effect to force the fertilizer longitudinally of the hopper and through the discharge opening 15. By adjustment of the gate 16 said opening may be controlled to vary the quantity of material discharged therethrough thus enabling the operator to gage the supply of fertilizer in accordance with the particular connection.

The parts are preferably of metal to avoid undue wear and provide the desired lightness and it is to be understood that they may be varied in proportion to accommodate a greater or less quantity of material if desired.

Having thus fully described the invention, what is claimed as new is:—

A fertilizer distributer comprising a frame, a forwardly disposed supporting wheel therefor, a hopper mounted on the frame, a movable feed screw having suitable connections with the supporting wheel, whereby propulsion of the distributer will operate the screw, said screw seated in a semicylindrical casing having a discharge opening at its rear end, a guard plate extending inwardly from the rear wall of the hopper and over said opening, an adjustable gate adapted to close the discharge opening having a laterally projecting arm provided with a threaded opening, and means for adjusting the gate relative to said opening.

In testimony whereof, I affix my signature in presence of two witnesses.

ROBERT LEE GRAVES.

Witnesses:
T. N. L. ANDERSON.
J. H. DIXON.